(12) United States Patent
Wang

(10) Patent No.: US 7,077,347 B1
(45) Date of Patent: *Jul. 18, 2006

(54) ELECTRIC PEPPER MILL

(75) Inventor: Chih-Hung Wang, Tainan Hsien (TW)

(73) Assignee: Duo Yeu Metal Co., Ltd., Tainan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/142,284

(22) Filed: Jun. 2, 2005

(51) Int. Cl.
*A01D 34/90* (2006.01)
*A47J 42/00* (2006.01)
*A47J 43/00* (2006.01)

(52) U.S. Cl. .................... 241/169.1; 241/168; 241/258
(58) Field of Classification Search ................ 241/168, 241/169, 169.1, 258
See application file for complete search history.

(56) References Cited

U.S. PATENT DOCUMENTS

| 3,734,417 | A | * | 5/1973 | Russell et al. ............... 241/168 |
| 4,685,625 | A | * | 8/1987 | Mazza .......................... 241/36 |
| 4,925,150 | A | * | 5/1990 | Tedioli ..................... 241/169.1 |
| 5,022,591 | A | * | 6/1991 | Sanders .................... 241/169.1 |
| 6,830,205 | B1 | * | 12/2004 | Wang ....................... 241/169.1 |
| 6,830,206 | B1 | * | 12/2004 | Yang ........................ 241/169.1 |

* cited by examiner

*Primary Examiner*—Faye Francis
(74) *Attorney, Agent, or Firm*—Rosenberg, Klein & Lee (57) ABSTRACT

An electric pepper mill is provided that is equipped with two terminal legs that normally do not touch each other, and a pressing block. When the pepper mill is in an upright position, the pressing block rests on the terminal legs to connect the terminal legs. circuit including a motor and batteries and when the motor is powered the pepper mill operates to grind pepper. When the pepper mill is in an upside-down position, the circuit including the motor and the batteries will be in the opened position, and the pepper mill will not operate.

2 Claims, 8 Drawing Sheets

ELECTRIC PEPPER MILL

BACKGROUND OF THE INVENTION

1. Field of the Invention

The present invention relates to an electric pepper mill, more particularly one, which is equipped with such a conducting element that the electric circuit thereof will be opened when the pepper mill is placed in an upside down position; thus, the pepper mill will not be powered to work in an upside down position.

2. Brief Description of the Prior Art

Figure 10:
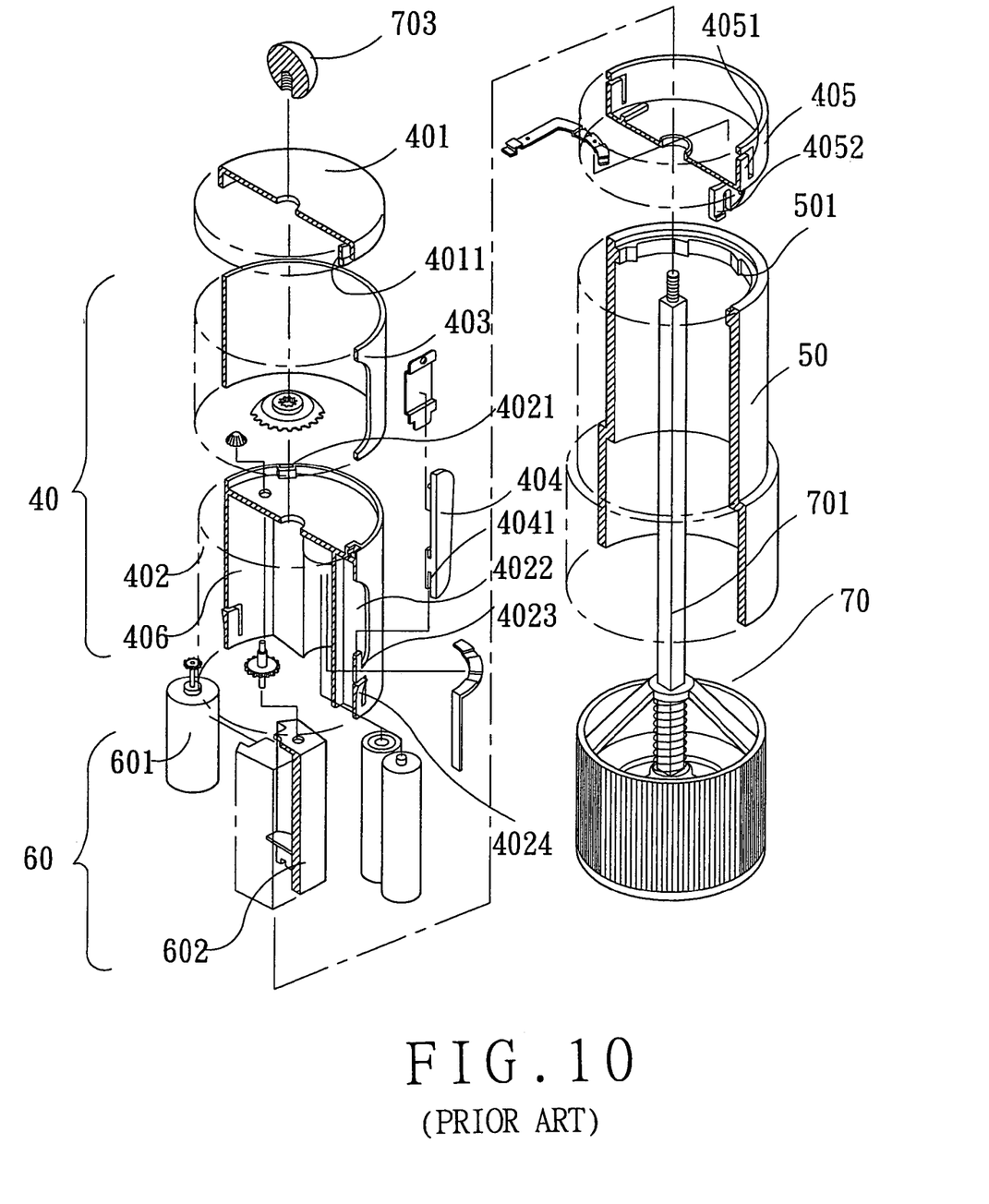
FIG. 10 is an exploded perspective view of the conventional pepper mill as described in the Background.
Figure 11:
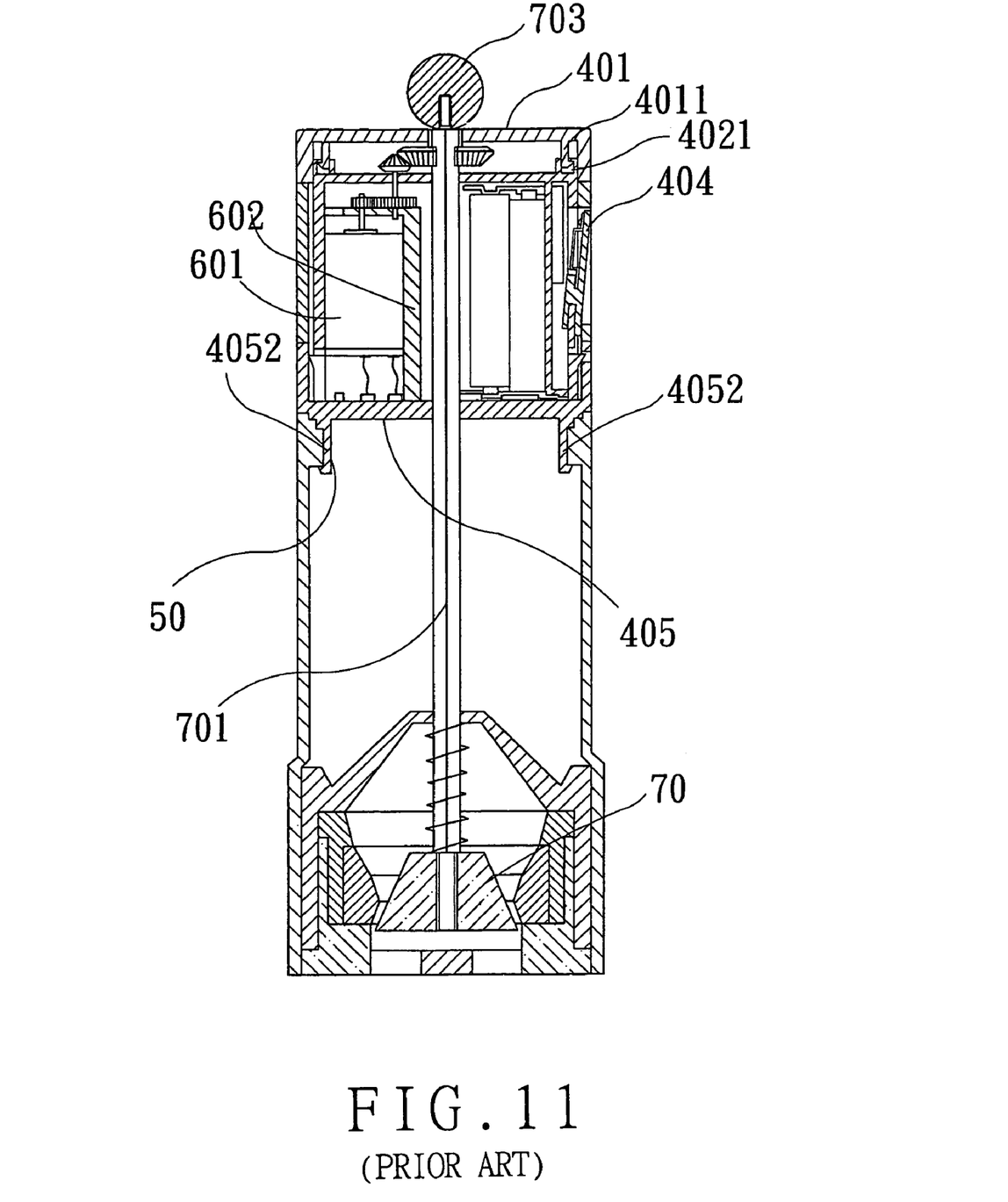
FIG. 11 is a cross-sectional view of the conventional pepper mill.

Electric pepper mills are very popular because they can save the users a lot of labor. Referring to FIGS. 10 and 11, a conventional pepper mill includes a main body 40, a pepper holding member 50, a power unit 60, and a grinding unit 70.

The main body 40 includes an upper cover 401, a cylindrical element 402, a transparent element 403, and a manual turning plate 405; the upper cover 401 is joined to an upper end of the cylindrical element 402 with three hooks 4011 thereof engaging corresponding trenches 4021 of the cylindrical element 402; the transparent element 403 is fitted around the cylindrical element 402; the cylindrical element 402 has a slot 4022, a protrusion 4023 sticking up form the lower end of the slot 4022; a switch 404 is up and down movably fitted to the slot 4022 with a mortise 4041 thereof being fitted over the protrusion 4023; the switch 404 is normally biased to an off position, and can be pushed down to an on position; the cylindrical element 402 is detachably joined to the manual turning plate 405 with engaging protrusions 4024 of the lower end thereof being fitted into engaging trenches of the turning plate 405, which are formed adjacent to pushed block 4051 of the turning plate 405; the cylindrical element 402 can be detached from the manual turning plate 405 when the pushed block 4051 are pushed.

A fixing chamber 406 is provided in the cylindrical element 402 while the power unit 60 has a motor holder 602 fixedly disposed in the fixing chamber 406, and a motor 601 held in the motor holder 602.

The grinding unit 70 includes a transmission shaft 701, which is connected to a central gear 702 of a gear combination joined to the shaft of the motor 601 at an upper end; the transmission shaft 701 is further screwed into an adjustment knob 703 arranged above the upper cover 401 so that fineness of ground pepper can be adjusted by means of the knob 703.

The manual turning plate 405 is joined to the upper end of the pepper holding member 50; the manual turning plate 405 is formed with stopping parts 4052, which are engaged with sloping stop protrusions 501 of the pepper holding member 50 to prevent the holding member 50 from turning together with the transmission shaft 701.

The pepper mill is not very convenient to use because the user has to keep on pressing the switch 404 in order for the pepper mill to work. If the pepper mill is equipped with such a switch instead of the one 404 that the pepper mill can continue working after the switch has been moved to the on position, the switch has to be moved back to the off position when the user wants to stop using the mill. Therefore, the pepper mill is still not very convenient to use with such switch.

To overcome the above-mentioned problem, the inventor of the present invention taught an improvement on an electric pepper mill in U.S. Pat. No. 6,830,205 filed on 11th Feb. 2003, and in European Community Patent application no. 0300367 filed on 18th Feb. 2003, which is equipped with such a conducting element that the pepper mill will start working to grind pepper when it is in an upright position, and such that the pepper mill will stop working as soon as it is moved to an upside-down position.

SUMMARY

It is a main object of the present invention to provide another electric pepper mill, which will be powered to work in an upright position, and won't be powered in an upside-down position.

The electric pepper mill of the present invention is equipped with two terminal legs, and a pressing block. The terminal legs normally don't touch each other. When the pepper mill is turned to an upright position, the pressing block will rest on the terminal legs to connect the terminal legs, and a circuit will be closed, which consists of a motor and batteries of the pepper mill, and in turn the motor is powered, and the pepper mill works to grind pepper. When the pepper mill is in upside-down position, the pressing block won't rest on the terminal legs, and in turn the circuit will be in the opened position, and the motor won't be powered.

DETAILED DESCRIPTION OF THE PREFERRED EMBODIMENTS

Figure 1:
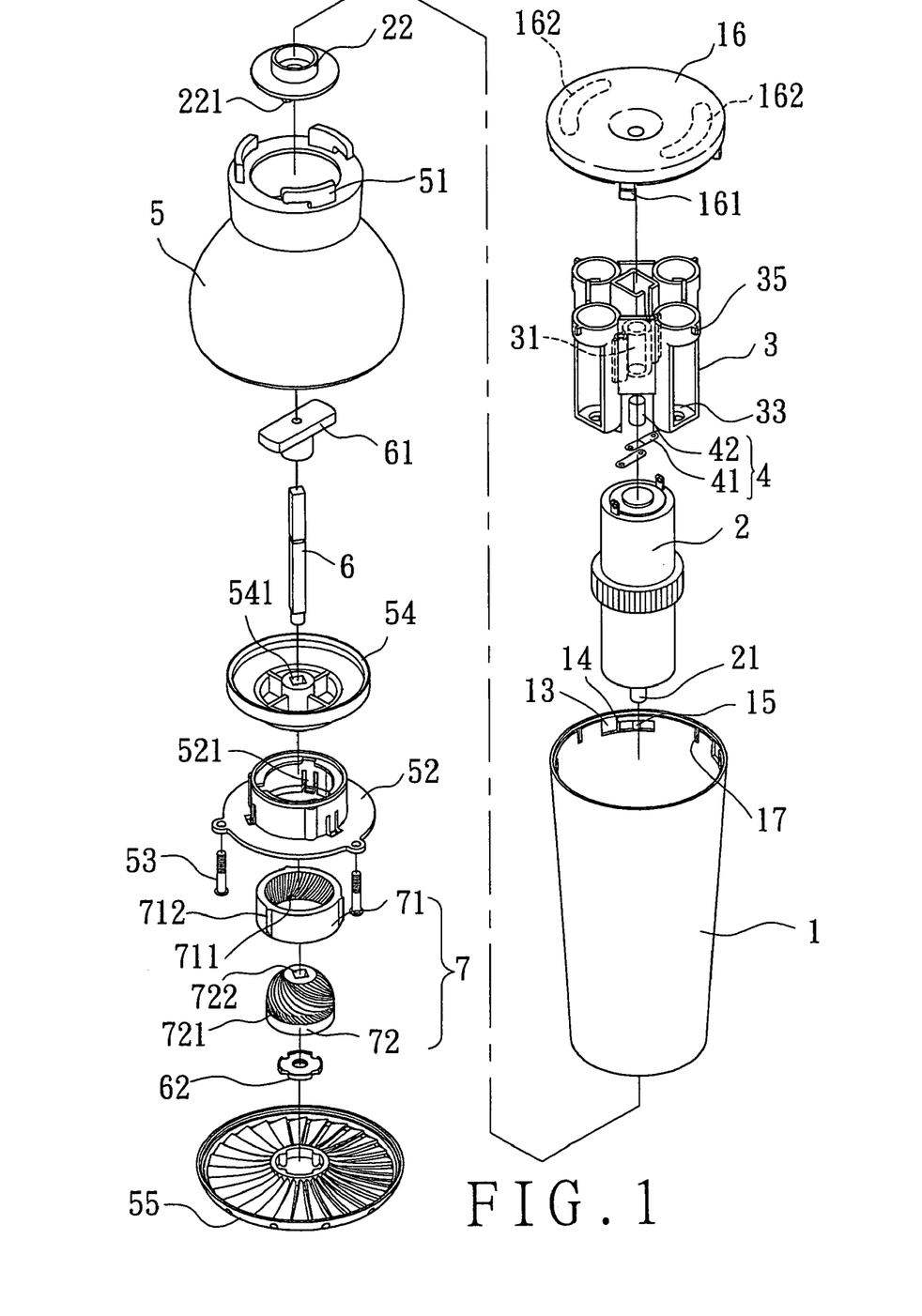
FIG. 1 is an exploded perspective view of the electric pepper mill according to the present invention.
Figure 2:
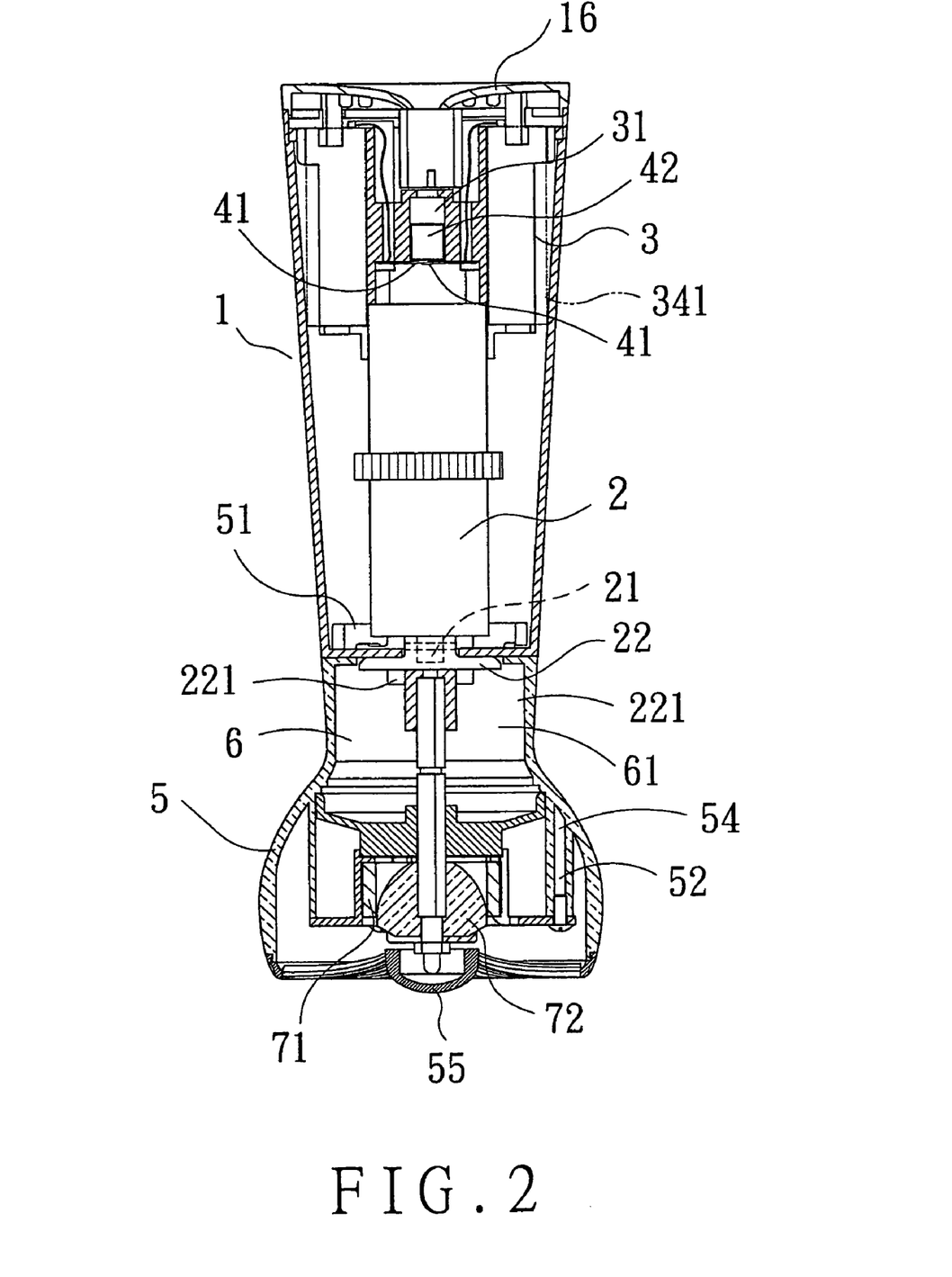
FIG. 2 is a vertical sectional view of the electric pepper mill according to the present invention.
Figure 3:
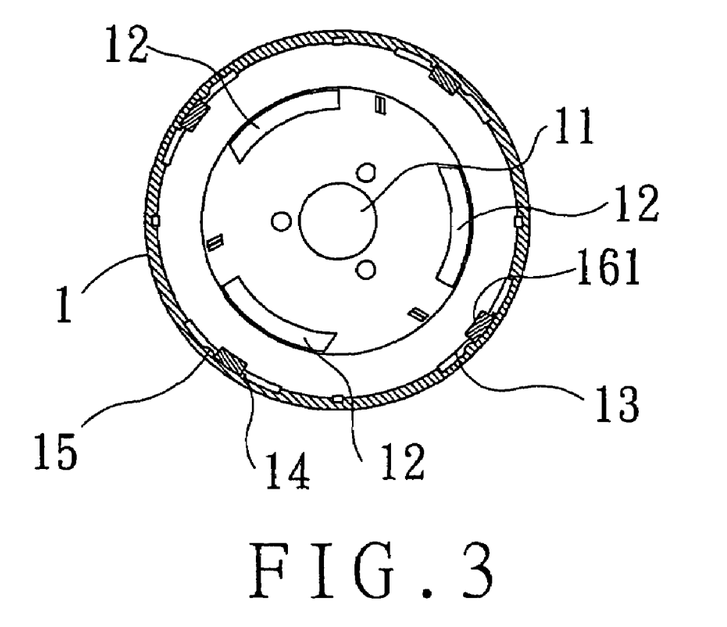
FIG. 3 is a partial horizontal sectional view of the electric pepper mill of the present invention.

Referring to FIGS. 1, 2, and 3, an electric pepper mill of the present invention includes a main body 1, a motor 2, a battery holder 3, a conducting element 4, a pepper holding element 5, a transmission shaft 6, and a grinding unit 7.

The main body 1 has, as shown in FIG. 3, a through hole 11 at the center, three connecting holes 12 spaced out on the edge, several L-shaped fixing trenches 13 on an inner side of an upper end, ribs 14, 15 formed on each L-shaped fixing trench 13, and engaging trenches 17 between the L-shaped fixing trenches 13, and is joined to an upper cover 16 at the upper end thereof; the upper cover 16 has spaced hooks 161 sticking down from the edge thereof; to join the upper cover 16 to the main body 1, the hooks 161 are first fitted to bigger portions of respective fixing trenches 13, and then the upper cover 16 is turned for the hooks 161 to be fitted between the ribs 14 and 15 formed on respective fixing trenches 13. The upper cover 16 further has two curved conducting portions 162 opposite each other on the lower side.

The motor 2 is disposed in the main body 1 with a shaft 21 thereof being passed through the hole 11 of the main body 1; the shaft 21 is further connected to a transmission sleeve 22, which is positioned under the main body 1, and which has two projections 221 on a lower side.

The battery holder 3 has a central chamber 31 on a middle of a lower end thereof, four battery holding portions 33, an engaging protrusion 35 on each of the battery holding portions 33, and two opposing terminals 32, 32' beside the central chamber 31; four batteries 341 of a battery set 34 are held in respective holding portions 33; the battery holder 3 is fixedly disposed above the motor 2 in the main body 1 with the engaging protrusion 35 thereof engaging respective ones of the engaging trenches 17.

Figure 4:
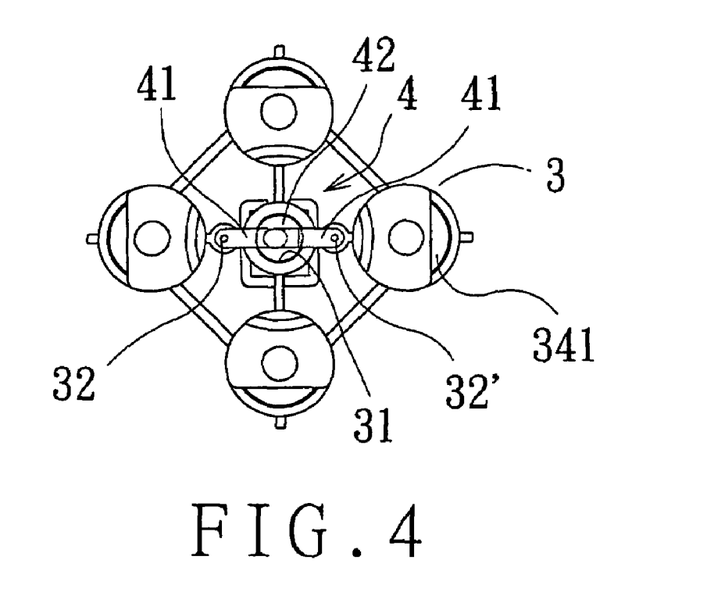
FIG. 4 is a bottom view of the conducting element and other parts of the power unit according to the present invention.
Figure 5:
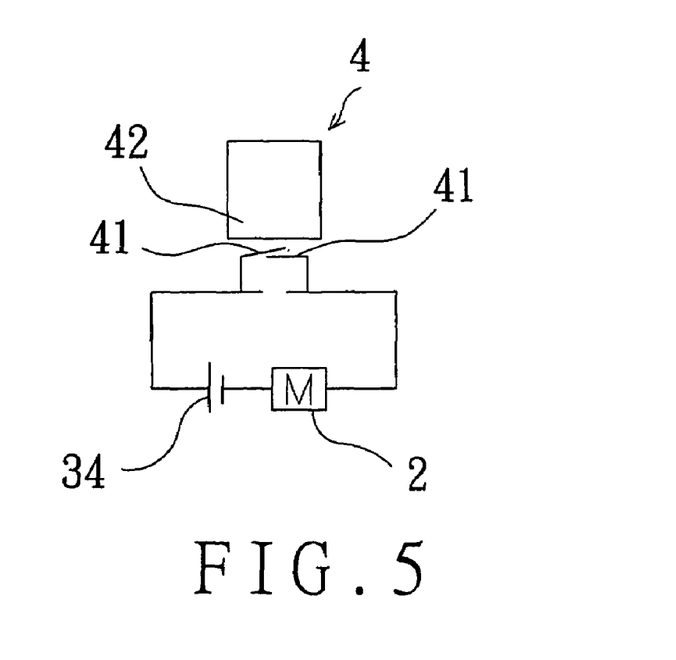
FIG. 5 is a circuit diagram of the present invention.

Referring to FIG. 4, which is a bottom view of the battery holder 3, and FIG. 5, the conducting element 4 is held in the central chamber 31 of the battery holder 3, and has two terminal legs 41, 41. The terminal legs 41, 41 are connected to the terminals 32, 32' respectively, and a free end of one of the terminal legs 41, 41 is right above, and apart from a free end of the other one of the terminal legs 41, 41. Furthermore, a pressing block 42 is held in the central chamber 31 of the battery holder 3.

Figure 6:
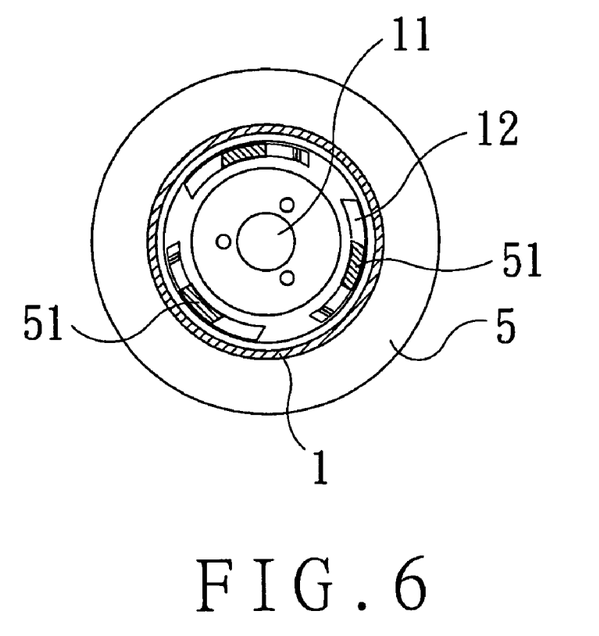
FIG. 6 is another partial cross-sectional view of the electric pepper mill of the present invention.

The pepper holding element 5 has three spaced L-shaped engaging plates 51 on the edge of the upper end, and is secured to the lower end of the main body 1 with the engaging plates 51 engaging respective connecting holes 12 as shown in FIG. 6. A fixing ring 52 is positioned in the holding element 5, and fixedly joined to the same with screws 53; a disk 54 is fixedly positioned on top of the fixing ring 52, which has a polygonal hole 541; the fixing ring 52 has elastic engaging hooks 521 spaced on the edge, and gaps (not numbered) above the hooks 521. A bottom disk 55 is fixedly joined to the lower end of the pepper holding element 5.

The transmission shaft 6 has a cross-section in the shape of the polygonal hole 541 of the disk 54, and is passed through the polygonal hole 541 and the fixing ring 52. A co-moving bar 61 is joined to the upper end of the transmission shaft 6, and engages the transmission sleeve 22 with two ends thereof being positioned between the projections 221 of the bottom of the transmission sleeve 22; thus, rotation of the shaft 21 of the motor 2 can be passed on to the transmission shaft 6.

The grinding unit 7 includes an inner grinding part 72, and an outer grinding part 71 positioned around the inner part 72. The inner part 72 has teeth 721 on the outer side, and a polygonal hole 722; the transmission shaft 6 is fitted into the polygonal hole 722 at a lower portion, and is passed into a central round hole of a locating element 62 at a round lower end. The outer part 71 has teeth 711 on the inner side thereof, and protrusions 712 spaced on the inner side. The outer part 71 is disposed in the fixing ring 52 with the protrusions 712 engaging the elastic hooks 521 as well as the gaps of the fixing ring 52 so that the outer part 71 can't move or rotate relative to the fixing ring 52. Thus, the inner part 72 can rotate relative to the outer part 71 for grinding pepper when the motor 2 is powered.

Figure 7:
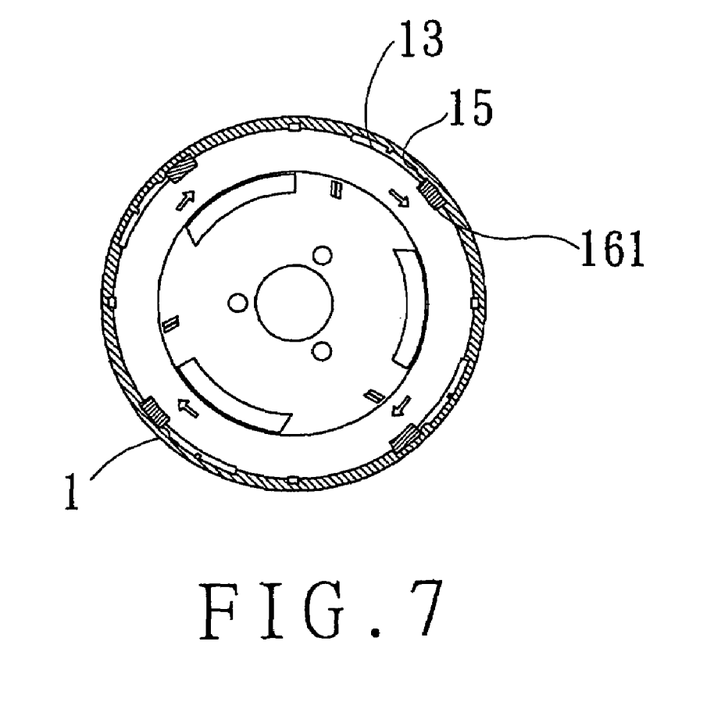
FIG. 7 is a partial cross-sectional view of the pepper mill of the invention with the upper cover being turned to another position.
Figure 8:
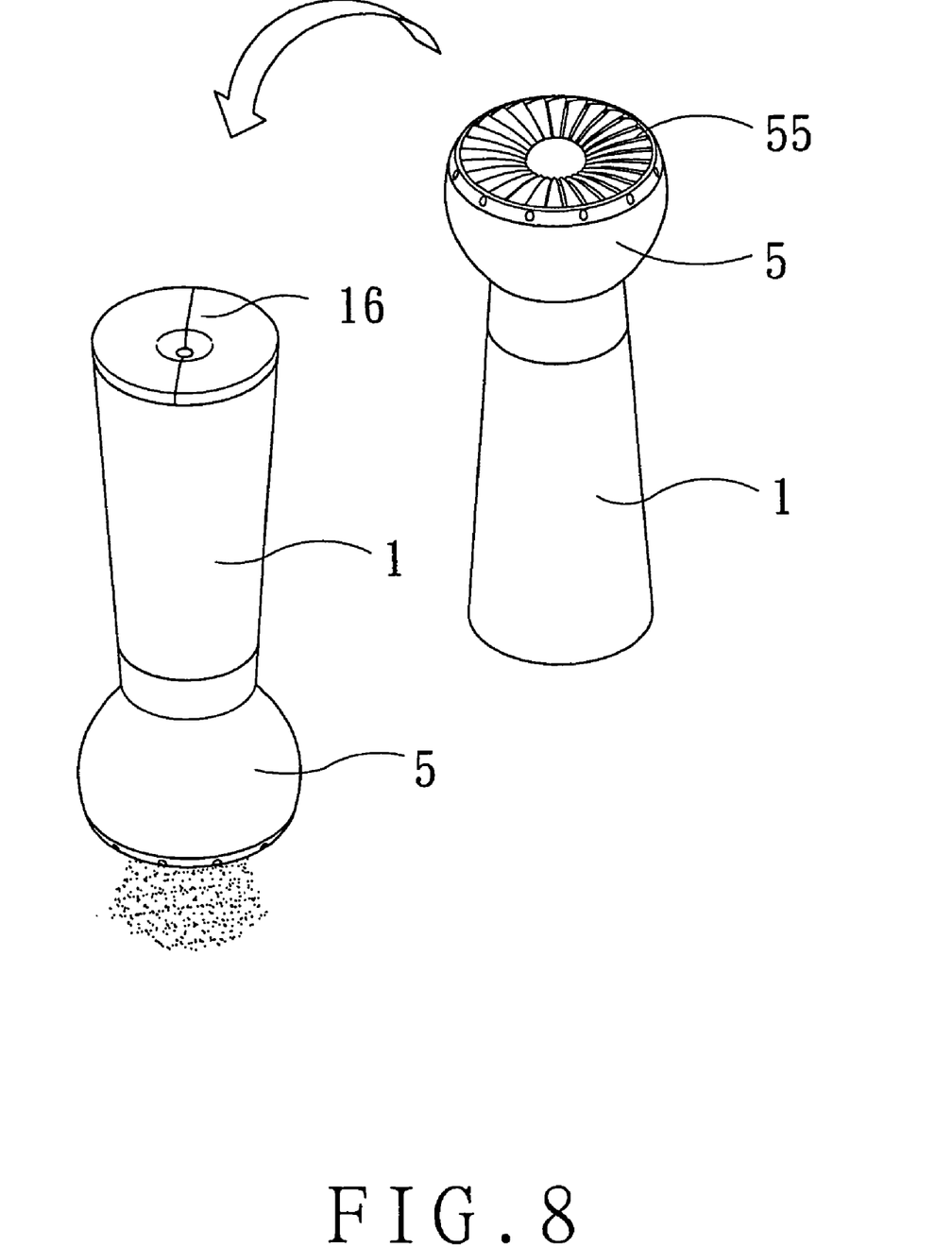
FIG. 8 is a view showing the way of using the electric pepper mill of the present invention.

To separate the main body 1 from the holding element 5 for allowing peppercorns to be added into the holding element 5, the main body 1 is first turned relative to the holding element 5 for a short angle to disengage the engaging plates 51 from the fixing trenches 13. To use the pepper mill to grind pepper, first, the upper cover 16 is first turned relative to the main body 1 until the hooks 161 pass the ribs 15, as shown in FIG. 7, so that the curved conducting portions 162 of the upper cover 16 come into contact with the batteries 341 for the batteries 341 to be connected together. Then, the pepper mill is turned to an upright position where the main body 1 is above the holding element 5; thus, the pressing block 42 rests on the terminal legs 41, 41, and makes the terminal legs is 41, 41 get into contact with each other, and in turns, the circuit is closed, and the motor 2 is powered by the batteries 341.

Figure 9:
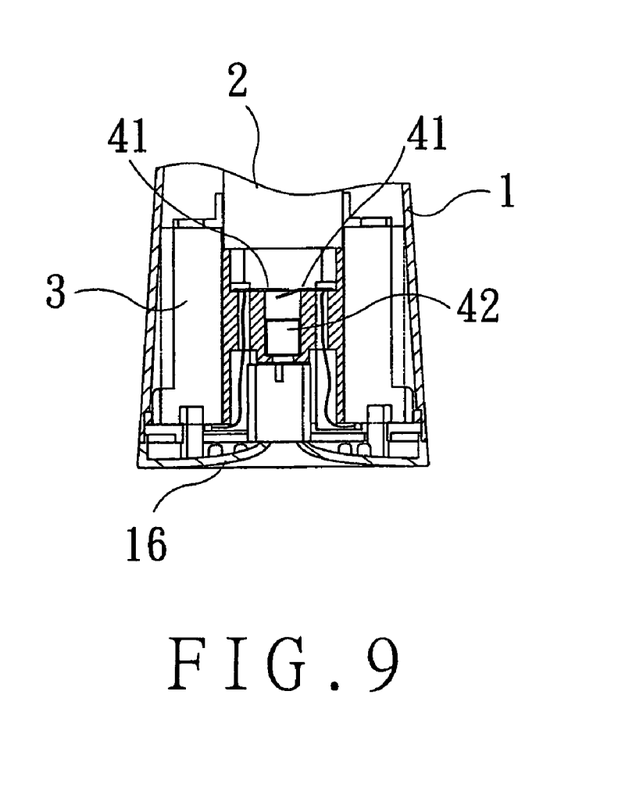
FIG. 9 is a partial cross-sectional view of the electric pepper mill of the present invention in the upside-down position.

To stop the pepper mill, referring to FIG. 9, the pepper mill is turned to the upside-down position so that the pressing block 42 is apart from the terminal legs 41, 41, and in turns, the circuit of the pepper mill is opened, and the motor 2 is no longer powered.

From the above description, it can be easily understood that the pepper mill of the present invention is relatively convenient to use because after the upper cover 16 has been turned for the curved conducting portions 162 to come into contact with the batteries 341 to connect the batteries 341 together, the user can make the pepper mill work to grind pepper by means of turning it to the upright position, and make it stop working by means of turning it upside down. When the curved conducting portions 162 are made to no longer contact the batteries 341 by means of turning the upper cover 16, the motor 2 won't be powered with the batteries 341 no matter which positions the pepper mill is moved to.

What is claimed is:

1. An electric pepper mill, comprising:
   a hollow main body having an upper cover rotatably joined to an upper end thereof;
   a motor disposed in said main body, said motor including a shaft passing through a lower end of said main body;
   a battery holder disposed in said main body, said battery holder receiving a battery set therein;
   a conducting element located in a central chamber of said battery holder, said conducting element including first terminal legs and second terminal legs, said first and second terminal legs being electrically coupled to said battery set and said motor respectively;
   a pressing block being received in said central chamber, said pressing block being displaced from said first and second terminal legs, said first and second terminal legs being displaced each from the other when said hollow main body is in an inverted position, said pressing block being contiguous said first and second terminal legs when said hollow main body is in an upright position;
   a pepper holding element detachably joined to said lower end of said main body;
   a rotatable transmission shaft disposed within said pepper holding element, said transmission shaft being rotatable with said shaft of said motor;
   a grinding unit including a rotatable inner grinding part and an outer grinding part, said outer grinding part being positioned around said rotatable inner grinding part, said rotatable inner grinding part being coupled to said transmission shaft;
   a first position wherein said upper cover is coupled to said battery set; and
   a second position wherein said upper cover is detached from said battery set, whereby, said pepper mill is operable when said pepper mill is in said upright position and said upper cover is in said first position, said pepper mill being inoperable when said pepper mill is in said inverted position.

2. The electric pepper mill as recited in claim 1, further comprising:

a plurality of L-shaped fixing trenches defined on an inner surface of said upper end of said hollow main body, said L-shaped fixing trenches including first and second ribs formed thereon;

a set of opposing curved conducting portions formed on a lower side of said upper cover; and a plurality of hooks projecting from an edge of said upper cover and engaging respective L-shaped fixing trenches, whereby rotation of said upper cover controls contact between said conducting portions and said battery set.

* * * * *